United States Patent [19]

Zhang et al.

[11] Patent Number: 4,678,847
[45] Date of Patent: Jul. 7, 1987

[54] PROCESS FOR PREPARING A TERPOLYMER OF TETRAFLUOROETHYLENE, ETHYLENE AND A THIRD MONOMER

[75] Inventors: Yun-xiang Zhang; Xing-yi Dai; Zhi-kang Lu; Sen Zeng, all of Shanghai, China

[73] Assignee: Shanghai Institute of Organic Chemistry, Academia Sinica, Shanghai, China

[21] Appl. No.: 846,795

[22] Filed: Apr. 1, 1986

[30] Foreign Application Priority Data

Apr. 1, 1985 [CN] China ................................. 85100468

[51] Int. Cl.$^4$ .............................................. C08F 2/14
[52] U.S. Cl. ..................................... 526/206; 526/255
[58] Field of Search ................ 526/206, 253, 254, 255

[56] References Cited

U.S. PATENT DOCUMENTS

| | | | |
|---|---|---|---|
| 2,885,448 | 5/1959 | Miller | 526/206 |
| 4,033,939 | 7/1977 | Schulze | 526/255 |
| 4,123,602 | 10/1978 | Ukihashi | 526/253 |
| 4,338,237 | 7/1982 | Sulzbach | 526/255 |
| 4,521,575 | 6/1985 | Nakagawa | 526/255 |
| 4,585,306 | 4/1986 | Ohmori | 526/255 |

*Primary Examiner*—Paul R. Michl
*Attorney, Agent, or Firm*—Burns, Doane, Swecker & Mathis

[57] ABSTRACT

The present invention relates to the process for preparing terpolymer of tetrafluoroethylene (TFE), ethylene (E), and a third monomer. According to the present invention, dicarbonate peroxide is used as initiator, 1,1,2-trichloro-1,2,2-trifluoro-ethane as the reaction medium and compounds of molecular formula $C_nR_{2n+2}$, wherein, n=0,1, or 2; R=H, Cl or F, are gaseous chain telomeric agents to control the average molecular weight of copolymers, the formula of third monomer is $CF_2XCOCF_2 X'$ or

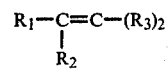

wherein X=X'=Cl or F, $R_1$=CF$_3$ or CH$_3$, $R_2$=CF$_3$, CH$_3$ or H, and $R_3$=H or F, usually the molar ratio of TFE to E is from 60:40 to 40:60 with the content of the third monomer being from 0.1% to 10%, based on the total molar amount of TFE and E.

21 Claims, No Drawings

PROCESS FOR PREPARING A TERPOLYMER OF TETRAFLUOROETHYLENE, ETHYLENE AND A THIRD MONOMER

DESCRIPTION OF THE PREFERRED EMBODIMENTS

The present invention relates to the preparation of fluorine-containing copolymer and the process for manufacturing the terpolymer of tetrafluoroethylene (TFE), ethylene (E) and a third monomer.

In order to obtain good quality of the copolymer of TFE and E, there has been research work concerning the method of polymerization and the use of a third monomer during last three decades. In the early 1970's freon solution precipitation polymerization was developed as disclosed in U.S. Pat. No. 3,528,954, and the method of TFE-E copolymerization has been discussed in U.S. Pat. No. 3,624,250. In this reaction, the precipitation forms immediately after the initiation of polymerization and the viscosity of the medium increases steeply, the terminative collision probability of terminal radicals of the macromolecular chain decreases, but the rate of propagation is much more rapid than the rate of termination in the late reaction. It is obvious that the rate of polymerization will be more and more rapid. This phenomenon results in sharply increased average molecular weight and over-heating of the polymerization medium at local places. Thus, it is very important to control the average molecular weight of the copolymer in the solution precipetation polymerization method. Another problem is the use of a third monomer in the copolymerization of TFE and E. To improve the mechanical properties of a copolymer of TFE and E, especially at high temperature, the monomers $R-CF=CF_2$ or $ROCF=CF_2$ as disclosed in U.S. Pat. No. 3,642,250 and $R_r-CF=CH_2$ as disclosed in European patent publication No. 123,306 were used as the third monomer wherein R or Rr is alkyl or aryl, however, the third monomer is very expensive. German patent publication No. 2,355,469 discloses a simple third monomer (such as $CF_3-CF=CF_2$ or $CF_3-CH=CH_2$) used in suspension (include water plus organic solvent) or emulsion polymerization for the preparation of the terpolymer of TFE and E. The aqueous medium can dissipate the heat of polymerization in this method, but it is very difficult to control the average molecular weight of the copolymer. U.S. Pat. No. 3,624,250 and Japanese patent publication NO. 143,887/75 mention that cyclohexane or n-pentane can be used as a telomeric agent in the copolymerization, but they don't disclose how to control the average molecular weight of the copolymer.

In order to overcome these disadvantages, the present invention uses the gaseous telomeric agent $C_nR_{2n+2}$, wherein n=0, 1 or 2; R=H, Cl, or F, such as $H_2$, $CH_4$, $C_2H_6$, $CHClF_2$, $CF_3Cl$, $CF_2Cl_2$, $CFCl_3$ and the like. The gaseous telomeric agent can diffuse to the face of precipitated particle together with the monomers of TFE and E. Thus, the average molecular weight of the copolymer (which is characterised by the melt index MI value) can be adjusted properly between values of 0.01-40. The thermal stability of the copolymer is good and the initial degradation temperature (Tdi) is constant within the region of MI value.

The present invention uses two simple kinds of a third monomer which are defined as follows:

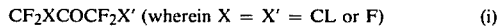

$CF_2XCOCF_2X'$ (wherein $X = X' = $ CL or F)  (i)

($R_1 = CF_3$ or $CH_3$; $R_2 = CF_3$, $CH_3$ or H, $R_3 = H$ or F)

A terpolymer of TFE and E having good mechanical properties (including tolerance to high temperatures such as 150°-200° C.) and excellent fabrication properties can be synthesized by using the third monomer and the above mentioned method of control average molecular weight.

The present invention uses dicarbonate peroxide of the formula

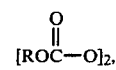

as a free radical initiator wherein

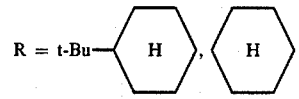

or iso-pr, such as t-butylcyclohexyl peroxide dicarbonate (BCPD) and dicy hexyl carbonate peroxide (DCPD), which have high initial efficiency and are cheaper than $(R_fCO)_2O_2$ which is used in U.S. Pat. No. 3,624,250.

In the present invention, 1,1,2-trichloro-1,2,2-trifluoro-ethane is used as the medium for solution precipetation polymerization for synthesizing the terpolymer of TFE, E and the third monomer. In accordance with the present invention, the molar percentages of the terpolymer are E 40-60% and TFE 60-40%, and the content of third monomer is 0.1-10% of total molar amount of TFE and E. The pressure is 2-20 Kg/cm² (gauge pressure). Preferably, the molar percentage content of E is 45-50%, TFE is 55-50%, and third monomer is 1-5% of the total molar amount of TFE and E. The preferred temperature is 40°-80° C., while the preferred pressure is 5-15 Kg/cm².

In accordance with the present invention, using the described gaseous telomeric agent, the third monomer and bicarbonate peroxide as the initiator in solution precipitation polymerization, can synthesize a terpolymer of TFE, E and the third monomer with good properties, and the MI value of the terpolymer can be adjusted properly, thus the terpolymer can be fabricated into various articles, such as a plate, rod, pipe, and cable or power line coating by normal thermoplastic fabrication.

The following examples serve to illustrate the present invention in more detail. However, they are not intended to limit its extent in any manner.

EXAMPLE 1

An agitated 2 liter stainless steel autoclave was flushed twice with nitrogen gas, and evacuated. Into the evacuated autoclave was placed 1000 ml of 1,1,2-trichloro-1,2,2-trifluoroethane (F-113) and 5 g perfluoroacetone ($CF_3COCF_3$). The temperature of this solvent was raised to 40° C., then a mixture of TFE and E (mole ratio TFE/E=75/25) was added to make the total pressure 8 Kg/cm². To the autoclave was then added 100 mg BCPD in 30 ml F-113 every 30 minutes, the temperature of the reactor being maintained at 40° C. The pressure was kept constant by continuous addition of the mixture of TFE and E (mole ratio TFE/E=50=50). Ater 90 minutes, the autoclave is then dumped and F-113 is flash evaporated and recovered from the copolymer. The copolymer was dried by vacuum for 20 hours at 120° C. The dried copolymer weighed 88 g.

EXAMPLE 2

Example 1 was repeated except the temperature of the reactor was kept at 70° C. The dried copolymer weighed 95 g.

EXAMPLE 3-6

These examples were all carried out as described in example 2 except that various amounts of trichlorofluoromethane ($CFCl_3$) were added as a telomeric agent. The results of these experiments are shown in Table 1.

TABLE 1

| Example NO | $CFCl_3$ (Vol % of F-113) | Copolymer weight (g) | MI | Tensile strength (Kg/cm²) 20° C. | 150° C. | Flex life - (time) | TDi (°C.) |
| --- | --- | --- | --- | --- | --- | --- | --- |
| 2 | 0 | 94 | 0.03 | 362 | 150 | 35416 | 357 |
| 3 | 1 | 98 | 0.25 | 320 | 130 | 19685 | 364 |
| 4 | 4 | 93 | 1.6 | 307 | 115 | 11781 | 362 |
| 5 | 7 | 95 | 8.1 | 280 | 95 | 3923 | 367 |
| 6 | 10 | 96 | 16.7 | 276 | 70 | 2913 | 360 |

EXAMPLE 7

Example 2 was repeated except that 20 g of $CF_3CH=CH_2$ was charged instead of the $CF_3COCF_3$. The dried copolymer weighed 89 g.

EXAMPLE 8

Example 2 was repeated except that 5 g of $(CH_3)_2C=CH_2$ was charged instead of the $CF_3COCF_3$. The dried copolymer weighed 75 g. The tensile strength of the terpolymer becomes poorer.

EXAMPLE 9

Example 2 was repeated except that 20 g of $CF_3CF=CF_2$ was charged instead of $CF_3COCF_3$. After the initial mixture of TFE and E was added, 4 Kg/cm² of $H_2$ was added again, the pressure was 12 Kg/cm². The dried copolymer weighed 85 g.

EXAMPLE 10

Example 9 was repeated except that methane was charged instead of hydrogen. The dried copolymer weighed 92 g.

TABLE 2

| | The condition of copolymerization and properties of copolymer | | | | |
| --- | --- | --- | --- | --- | --- |
| Example NO | $M_3$ | $M_3$ (g) | temp. (°C.) | telomeric agent | MI/°C. |
| 1 | $CF_3COCF_3$ | 5 | 40 | | 1.8/350 |
| 2 | $CF_3COCF_3$ | 5 | 70 | | 0.03/300 |
| 7 | $CF_3CH=CH_2$ | 20 | 70 | | 0.6/300 |
| 8 | $(CH_3)_2C=CH_2$ | 5 | 70 | | 0.1/300 |
| 9 | $CF_3CF=CF_2$ | 20 | 70 | $H_2$ | 4.5/300 |
| 10 | $CF_3CF=CF_2$ | 20 | 70 | $CH_4$ | 6.5/300 |

TABLE 2-continued

| Properties of copolymer | | | |
| --- | --- | --- | --- |
| tensile strength | | Elongation (%) | |
| 20° C. | 150° C. | 20° C. | 150°. C. |
| 410 | 110 | 300 | 470 |
| 362 | 96 | 310 | 450 |
| 389 | 95 | 305 | 460 |
| 304 | 80 | 270 | 380 |
| 410 | 111 | 300 | 520 |
| 420 | 120 | 310 | 540 |

EXAMPLE 11-14

These example were all carried out as described in example 2. After the initial mixture of TFE and E was added, the various amount of $CH_4$ was added again. The results of these experiment are shown in table 3.

TABLE 3

| Example No | $CH_4$ (mol % of TFE + E) | copolymer (g) | MI | tensile-strength Kg/cm² | TDi (°C.) |
| --- | --- | --- | --- | --- | --- |
| 11 | 0 | 89 | 0.08 | 358 | 360 |
| 12 | 1 | 91 | 0.25 | 335 | 365 |
| 13 | 2 | 93 | 0.86 | 327 | 367 |
| 14 | 4 | 95 | 2.50 | 305 | 365 |

EXAMPLE 15-18

These examples were all carried out as described in example 3 except that 20 g of $CF_3CF=CF_2$ was charged instead of $CF_3COCF_3$. The results of these experiments are shown in table 4.

TABLE 4

| Example No | $F_{11}$ (Vol % of F-113) | MI | tensile-strength (Kg/cm²) | TDi (°C.) |
| --- | --- | --- | --- | --- |
| 15 | 0 | 0.33 | 335 | 364 |
| 16 | 5.0 | 0.65 | 328 | 363 |
| 17 | 15.6 | 18.39 | 317 | 360 |
| 18 | 25.0 | 150 | 290 | 360 |

What we claim is:

1. A process for preparing a terpolymer by solution precipitation comprising reacting tetrafluoroethylene, ethylene and a third monomer having the formula $CF_2XCOCF_2X'$ or

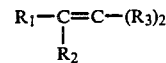

wherein $X=X'=Cl$ or F, $R_1=CF_3$ or $CH_3$, $R_2=CH_3$, $CH_3$ or H and $R_3=H$, F or a mixture thereof to form the terpolymer, said reacting being conducted in a reaction medium comprised of 1,1,2-trichloro-1,2,2-trifluoroethane and in the presence of a gaseous telomeric agent in an amount sufficient to control the average molecular weight of the terpolymer, said gaseous telomeric agent having the molecular formula $C_nR_{2n+2}$ wherein $n=0$, 1 or 2, and $R=H$, Cl, F or a mixture thereof provided that said gaseous telomeric agent is not $CHCl_3$ or $CCl_4$.

2. The process as claimed in claim 1, wherein the molar ratio of tetrafluoroethylene and ethylene is from 40:60 to 60:40, the content of the third monomer is 0.1–10% based on the total amount of tetrafluoroethylene and ethylene in mole.

3. The process as claimed in claim 2, wherein the molar ratio of tetrafluoroethylene and ethylene is from 55:45 to 50:50, the content of the third monomer is 1-5% based on the total molar amount of tetrafluoroethylene and ethylene in mole.

4. The process as claimed in claim 2, which comprises using dicarbonate peroxide

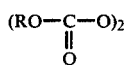

as an initiator, wherein R is cyclohexyl or tertbutylcyclohexyl.

5. The process as claimed in claim 3, which comprises using dicarbonate peroxide

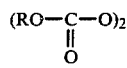

as an initiator wherein R is cyclohexyl or tert-butyl cyclohexyl.

6. The process as claimed in claim 2, wherein the temperature of polymerization is from 20° to 90° C., and the pressure of polymerization is from 2 to 20 Kg/cm².

7. The process as claimed in claim 6, wherein the temperature of polymerization is from 40°-80° C., and the pressure is from 5-15 Kg/cm².

8. The process as claimed in claim 3, wherein the temperature of polymerization is from 20°-90° C., and the pressure of polymerization is from 2-20 Kg/cm².

9. The process as claimed in claim 8, wherein the temperature of polymerization is from 40°-80° C., and the perssure is from 5 to 15 Kg/cm².

10. The process as claimed in claim 4, wherein the temperature of polymerization is from 20°-90° C., and the pressure is from 2 to 20 Kg/cm².

11. The process as claimed in claim 10, wherein the temperature of polymerization is from 40°-80° C., and the pressure is from 5 to 15 Kg/cm².

12. The process as claimed in claim 5, wherein the temperature of polymerization is from 20° to 90° C., and the pressure is from 2 to 20 Kg/cm².

13. The process as claimed in claim 12, wherein the temperature of polymerization is from 40° to 80° C., and the pressure is from 5-15 Kg/cm².

14. The process as claimed in claim 1, wherein the molar ratio of tetrafluoroethylene and ethylene is from 55:45 to 50:50, the content of the third monomer is 1-5% based on the total amount of tetrafluoroethylene and ethylene in mole.

15. The process as claimed in claim 1, which comprises using dicarbonate peroxide $(RO-C(=O)-O)_2$ as an initiator, wherein R is cyclohexyl or tertbutylcyclohexyl.

16. The process as claimed in claim 1, wherein the temperature of polymerization is from 20° to 90° C., the pressure of polymerization is from 2 to 20 Kg/cm².

17. The process as claimed in claim 1, wherein the terpolymer has a melt index in the range of 0.01-40.

18. The process as claimed in claim 1, wherein said gaseous telomeric agent is $CFCl_3$.

19. The process as claimed in claim 1, wherein said gaseous telomeric agent is $CH_4$.

20. The process as claimed in claim 1, wherein said gaseous telomeric agent is $H_2$.

21. The process as claimed in claim 18, wherein said $CFCl_3$ is present in an amount of about 1-10% by volume based on the 1,1,2-trichloro-1,2,2-trifluoroethane solvent.

* * * * *